United States Patent [19]

Ducret

[11] 4,359,819
[45] Nov. 23, 1982

[54] QUICK CLAMPING DEVICE TO HOLD BX CABLES

[76] Inventor: Lucien C. Ducret, 28 Lockwood Dr., Old Greenwich, Conn. 06870

[21] Appl. No.: 292,356

[22] Filed: Aug. 13, 1981

[51] Int. Cl.³ .............................................. B21F 13/00
[52] U.S. Cl. .................................................. 30/90.3
[58] Field of Search ........................................ 30/90.3

[56] References Cited

U.S. PATENT DOCUMENTS 3,851,387  12/1974  Ducret ................................. 30/90.3
4,142,290  3/1979  Ducret ................................. 30/90.3

Primary Examiner—Stephen G. Kunin
Assistant Examiner—J. T. Zatarga
Attorney, Agent, or Firm—DeLio and Libert

[57] ABSTRACT

A hand tool for cutting the armor of armored cable, comprising two elongated handle members hingedly connected, the first member carrying a manually operated circular saw and the second member having a channel in which the cable is clamped during cutting. The improvement including a clamping plunger carried by a third handle member which is hinged to the second member and manually activated to press the plunger firmly and/or resiliently against the cable to hold it firmly against the wall of the channel during the cutting operation.

7 Claims, 5 Drawing Figures

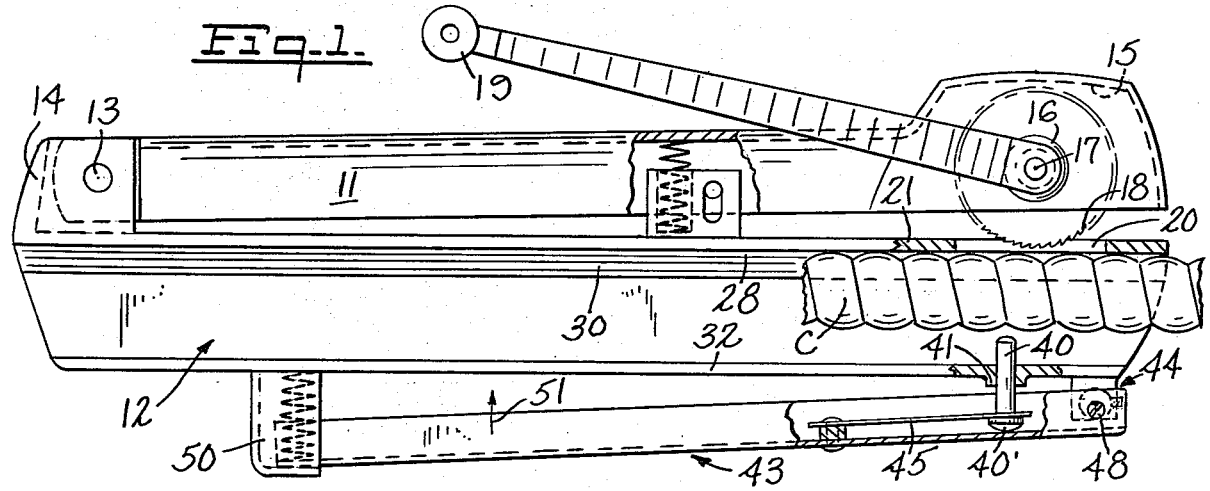
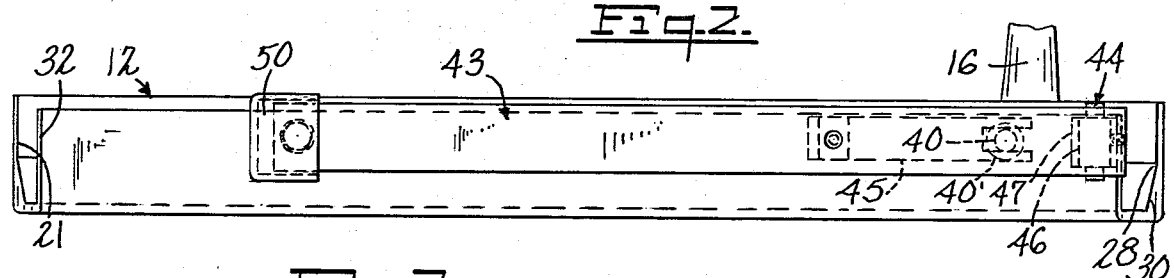
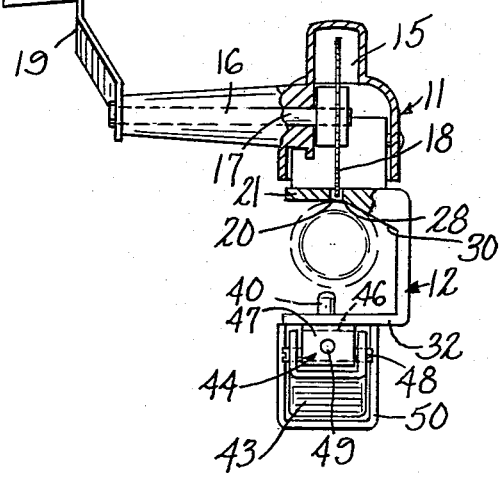
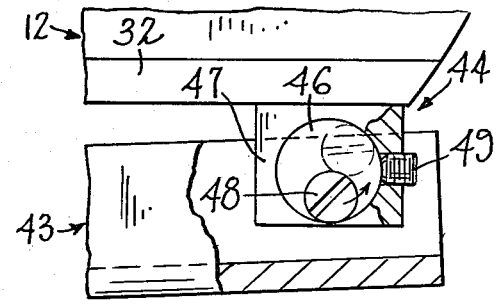
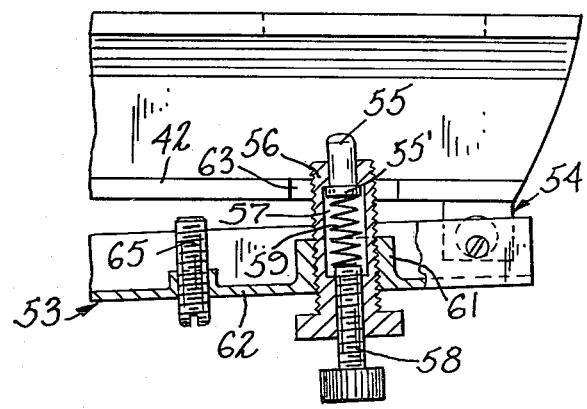

QUICK CLAMPING DEVICE TO HOLD BX CABLES

This invention relates to a manual tool for cutting the shielding or armor of a shielded conduit such as BX cable and the like. It relates more specifically to an improvement in the means for holding the cable in proper position to have its armor cut longitudinally by a circular saw, as in applicant's U.S. Pat. No. 3,851,387, Dec. 3, 1974, the disclosure of which is incorporated herein by reference.

The device disclosed in said patent has been very successful in replacing the use of hack saws in the cutting of shielded conduits, so that the shielding can be cut without the blade touching the conduit or cable materials below the shielding. This is particularly important when it is desired to cut shielded electrical conduits such as BX cable since the shielding is metallic or of other tough material which is difficult to cut without slipping of the cutter head with consequent jagged edges and possibility of injury to an operator and material below the shield. It is important therefore to be able to maintain the cutter head in a rigid and fixed relationship to the shielding while at the sme time guarding against injury either to the operator or to the conduit.

The patented tool constitutes an effective device for cutting the shielding of a shielded conduit, which device can easily be held in one hand while manipulating with the other hand a means for operating the cutter head of the device.

While the patented tool is adaptable to different gauge conduits such as BX cable and has means to hold the conduit accurately for efficient cutting, the use of a thumb screw for that purpose is sometimes rather awkward and inconvenient.

It is accordingly an object of the present invention to provide a tool of the character described wherein cables of a range of sizes can be gripped firmly and held accurately in proper position during cutting by resilient means which requires no special manual adjustment except when a substantial variation in gauge is encountered.

It is a further object of the invention to provide a cable gripping means which adjusts automatically to cables within a reasonable and practical range of sizes.

It is yet another object of the invention to provide certain improvements in the form, construction and arrangement of its several parts whereby the above named and other objects may effectively be attained.

The invention accordingly comprises the features of construction, combination of elements, and arrangement of parts which will be exemplified in the construction hereinafter set forth, and the scope of the invention will be indicated in the claims.

The basic tool comprises first and second elongated handle members, hinged together at one end, a manually rotated circular saw being mounted in a cutter head at the free end of the first member, which is a downwardly facing channel, and the second member being constituted by a laterally open channel adapted to receive the armored cable to be cut. The channel of the second member is profiled to ensure the correct positioning of the cable, adjacent a slot in its upper wall through which the saw can project when the handle members are pressed together. The cable is held firmly against the upper wall of the second member by a sliding plunger controlled by, or mounted on, a third or auxiliary handle member in the form of a lever hinged to the bottom of the second member near its free end and extending beneath the second member part way toward the hinge end thereof.

A practical embodiment of the invention is shown in the accompanying drawing wherein:

FIG. 1 represents a side elevation of the tool with a small length of cable placed, but not held, in the cutting zone, parts being broken away;

FIG. 2 represents a bottom plan view of the tool, the crank being omitted;

FIG. 3 represents an end elevation of the tool from the right of FIG. 1, parts of the cutter head being broken away and in section;

FIG. 4 represents a detail side elevation of the adjustable hinge between the second and third members, parts being broken away and in section; and FIG. 5 represents a detail elevation showing a modified form of cable retaining plunger, parts being broken away and in section.

Referring to the drawing and particularly FIGS. 1 to 4 thereof, the tool includes a first elongated handle member 11 and a second elongated handle member 12 hinged together adjacent one end as by means of a pin 13. The members 11 and 12 are generally U-shaped in cross-section, the open side of the member 11 facing toward member 12 and the open side of member 12 facing sideways, as shown in FIG. 3. A hood 14 at the hinge end of member 12 covers the end of member 11 and provides seats for mounting the pin 13.

Adjacent its free end the member 11 is enlarged to define a chamber 15, one wall of which is provided with an elongated bushing 16 for the shaft 17 of the circular saw 18. The edge of the saw blade projects below the lower edge of the member 11 far enough to be able to pass through a slot 20 in the upper wall 21 of the member 12. The saw can be rotated manually by means of the hand crank 19.

The interior cavity in member 12 is profiled to present an interior angle 28 at the intersection of the horizontal wall 21 and the sloping wall 30, this intersection being adjacent and parallel to the slot 20 and the cutting plane of the saw 18. For accurate cutting of a cable armor, the cable must be seated firmly against the walls 21 and 30, which was accomplished in the tool of U.S. Pat. No. 3,851,387 by means of a thumb screw 29 in the lower wall of the member 12. The geometry of the cable engagement and cutting is well illustrated in FIG. 5 of U.S. Pat. No. 3,851,387.

According to the present invention, the firm and accurate securement of the cable against the walls 21 and 30 is effected by means of a plunger 40 passing freely through a journal 41 in the lower wall 32 of the member 12. The plunger is supported and moved by a third handle member 43 which is channel-shaped in cross-section with its open side facing upward toward the bottom of wall 32 on which it is mounted by means of the adjustable journal indicated generally at 44. The plunger 40 has an enlarged head 40' which is held seated against the lower wall of member 43 by a leaf spring 45 having a slotted end for convenience in assembly with the plunger head, as shown in FIG. 2, and to permit sliding of the head on said lower wall resulting from straight line movement of the plunger and slightly arcuate movement of said wall. The journal 44 includes a hub 46 mounted in the bore of a block 47 which is secured to the bottom of the wall 32. A pin 48 passes eccentrically through the hub 46, engaging at each end in the side walls of the handle member 43, as shown in FIG. 3. A set screw 49 in the block 47 secures the hub 46 in any adjusted position for the purpose described below. The free end of the member 43 is protected by a cup-shaped guard 50 which limits the movement of the member, acting as the plunger moving element, between the retracting position shown in FIG. 1 and a plunger advancing position (indicated by the arrow 51).

The range of movement of the plunger 40 and particularly its point of maximum advancement, is adjusted according to the size of armored cable to be cut, by rotating the hub 46 in the block 47 to raise or lower the pin 48 which constitutes the fulcrum of the member 43, acting as a plunger moving lever.

In operation, for cutting the armor on an armored cable (C in FIG. 1) such as BX cable, the hub 46 is adjusted to a position which has been predetermined in relation to the diameter of the cable to be cut and the set screw 49 is tightened to prevent deviation of the hub from its set position. The cable C is inserted, laterally, into the channel of the handle member 12 to the position shown in broken lines in FIG. 3, resting against the walls 21 and 30 and bridging their intersection at the angle 28. The operator grasps the tool in a manner to draw upward the member 43, in the direction of arrow 51, and thus force the plunger 40 strongly against the lower surface of the cable at a point offset from the plane of cutting of the saw (FIG. 3) and approximately diagonally opposite the angle 28. The manual compressive force which thus grips the cable firmly in the handle member 12 also presses the saw blade 18 against the cable surface, and the operator effects the desired cutting of the armor by grasping the crank handle 19 and rotating the saw.

In the operation just described the cable holding power of the plunger depends somewhat on the manual strength of the operator which, in some cases, might be excessive. This potential problem may be eliminated by the provision of an alternative form of plunger as shown in FIG. 5. In this alternative construction, the handle member 53 is hinged to the lower wall 42 of a handle member (like member 12) by an eccentric mounting 54 (like the adjustable journal 44). The plunger 55, with head 55', is slidable in the bore at the end of a threaded carrier 56, the head of the plunger resting within a larger bore 57. An adjusting screw 58 is threaded through the opposite end of the carrier 56 and a compression spring 59 is contained in the bore 57, between the plunger head 55 and the end of the screw 58. The carrier 56 is threaded through a boss 61 on the bottom wall 62 of the handle member 53 and projects through an opening 63 in the wall 42, to place the plunger 55 in a position to contact a cable (not shown). A set screw 65 is threaded in the wall 62 and can be adjusted to positions which limit the approach of member 53 toward the wall 42.

The operation of a tool provided with the plunger assembly just described is the same as the operation first described except that manual relative movement of the member 53 is positively arrested by the contact of set screw 65 against wall 42. The force exerted by plunger 55 against a cable to be cut (not shown) is predetermined by the adjustment of screw 58 to compress the spring 59, while the position of the plunger before engagement with the cable is determined by the adjusted position of the carrier 56 and the boss 61.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawing shall be interpreted as illustrative and not in a limited sense.

What I claim is:

1. A hand tool for cutting the shielding of a shielded conduit comprising:
    a first elongated handle member having a hinge end and a free end;
    a circular saw carried by said first member adjacent its free end in a position such that its cutting plane is parallel to the longitudinal axis of said first member;
    a second elongated handle member defining a cable-receiving channel, having a hinge end and a free end, hingedly connected to said first member at the hinge ends of said members, and being provided with a longitudinally disposed slot which is adjacent the free end of said second member and lies in the cutting plane of the circular saw;
    stop and guide means between said first and second members, adapted to control and delimit the relative hinging movement of said members;
    a third elongated member disposed substantially parallel to the second member and hingedly connected thereto adjacent the free end thereof;
    cable clamping means carried by said third member and being movable thereby toward and away from cable clamping position; and
    means for limiting the movement of said third member.

2. A tool according to claim 1 wherein the hinge between the second and third members is an adjustable journal.

3. A tool according to claim 1 or 2 wherein the cable clamping means is a plunger extending from the third elongated member through the second member.

4. A tool according to claim 3 wherein the plunger is journalled in the second member.

5. A tool according to claim 3 wherein the second handle member is provided with a downwardly opening aperture and the tool includes a plunger carrier mounted in the third member, a plunger slidably mounted in the carrier and projecting through said aperture, and resilient means associated with the carrier and biasing the plunger toward cable clamping position.

6. A tool according to claim 5 which includes means for adjusting the effective force of the resilient biasing means.

7. A tool according to claims 5 or 6 which includes an adjustable stop carried by one of the second or third member in a position to limit the movement of said members in the cable clamping direction.

* * * * *